(12) United States Patent
Shao

(10) Patent No.: US 10,977,750 B2
(45) Date of Patent: Apr. 13, 2021

(54) GAS PRICING METHOD BASED ON COMPOUND INTERNET OF THINGS (IOT) AND IOT SYSTEM

(71) Applicant: Chengdu Qinchuan IoT Technology Co., Ltd., Chengdu (CN)

(72) Inventor: Zehua Shao, Chengdu (CN)

(73) Assignee: Chengdu Qinchuan IoT Technology Co., Ltd., Chengdu (CN)

( * ) Notice: Subject to any disclaimer, the term of this patent is extended or adjusted under 35 U.S.C. 154(b) by 32 days.

(21) Appl. No.: 16/287,923

(22) Filed: Feb. 27, 2019

(65) Prior Publication Data

US 2020/0273119 A1   Aug. 27, 2020

(51) Int. Cl.
*G06Q 50/06* (2012.01)
*G06Q 30/00* (2012.01)
*G06Q 30/02* (2012.01)

(52) U.S. Cl.
CPC ......... *G06Q 50/06* (2013.01); *G06Q 30/0223* (2013.01); *G06Q 30/0283* (2013.01)

(58) Field of Classification Search
CPC .............. G06Q 50/06; G06Q 30/0223; G06Q 20/0283; H04Q 9/00; H04L 67/10; H04L 67/12; G05D 7/0635
USPC ....................................... 705/14.24; 700/282
See application file for complete search history.

(56) References Cited

U.S. PATENT DOCUMENTS

| | | | |
|---|---|---|---|
| 2013/0304264 A1* | 11/2013 | Shao | G05D 7/0629 700/282 |
| 2015/0058066 A1* | 2/2015 | Wada | G06Q 50/06 705/7.25 |
| 2015/0324776 A1* | 11/2015 | Wada | G06Q 20/145 705/40 |

FOREIGN PATENT DOCUMENTS

| | | | |
|---|---|---|---|
| CN | 205156932 U | 4/2016 | |
| CN | 105869067 A | 8/2016 | |
| JP | 2005038753 A * | 2/2005 | ............. Y02B 10/70 |

* cited by examiner

*Primary Examiner* — Sun M Li
(74) *Attorney, Agent, or Firm* — Getech Law LLC; Jun Ye

(57) ABSTRACT

The present invention relates to the field of Internet of Things (IoT), and provides a gas pricing method based on a compound IoT and an IoT system. The method is applied to the system. The system includes a user platform, a service platform, a plurality of management sub-platforms, a sensor network platform and a plurality of object sub-platforms; and each of the object sub-platforms includes a gas meter. According to the gas pricing method based on the compound IoT and the IoT system, a user can sense the benefit of gas saving directly from a fee, thereby helping push a gas-saving social morality.

4 Claims, 4 Drawing Sheets

| | |
|---|---|
| User 1 | 18.21% |
| User 2 | 18.13% |
| User 3 | 17.81% |
| User 4 | 17.11% |
| User 5 | 16.81% |
| User 6 | 15.91% |
| User 7 | 15.14% |
| User 8 | 14.44% |
| User 9 | 14.11% |
| User 10 | 13.15% |
| User 11 | 13.20% |
| User 12 | 11.87% |
| User 13 | 11.11% |
| User 14 | 10.21% |
| User 15 | 9.98% |

FIG. 3

| | |
|---|---|
| User 1 | RMB 55 Yuan |
| User 2 | RMB 72 Yuan |
| User 3 | RMB 99 Yuan |
| User 4 | RMB 43 Yuan |
| User 5 | RMB 99 Yuan |
| User 6 | RMB 47 Yuan |
| User 7 | RMB 105 Yuan |
| User 8 | RMB 107 Yuan |
| User 9 | RMB 74 Yuan |
| User 10 | RMB 58 Yuan |
| User 11 | RMB 114 Yuan |
| User 12 | RMB 63 Yuan |
| User 13 | RMB 66 Yuan |
| User 14 | RMB 74 Yuan |
| User 15 | RMB 88 Yuan |

FIG. 4

GAS PRICING METHOD BASED ON COMPOUND INTERNET OF THINGS (IOT) AND IOT SYSTEM

TECHNICAL FIELD

The present invention relates to the field of Internet of Things (IoT), and in particular to a gas pricing method based on a compound IoT and an IoT system.

BACKGROUND

In order to encourage the public to develop a social spirit of energy conservation and environmental protection, a gas tiered pricing charge rule is pushed forward by the government and gas company. With a larger gas usage amount, the charge standard is higher so as to limit the gas usage amount of a user. However, such a manner is applied only to a user without a large gas demand. For a user with a very large gas demand, a basic demand is up to a high pricing tier, the tiered pricing cannot achieve the purpose of making the user save the gas, and this type of user also cannot enjoy the benefit of gas saving.

SUMMARY OF THE INVENTION

In view of this, an objective of the present invention is to provide a gas pricing method based on a compound IoT and an IoT system to intuitively reduce a gas fee of a user and motivate the user to save gas.

To this end, the technical solutions adopted by the present invention are as follows:

According to a first aspect, the present invention provides a gas pricing method based on a compound IoT; the method is applied to an IoT system; the IoT system includes a user platform, a service platform, a plurality of management sub-platforms, a sensor network platform and a plurality of object sub-platforms; each of the object sub-platforms includes a gas meter; and the method includes:

sending, by each of the object sub-platforms, gas data of a corresponding gas meter to a corresponding management sub-platform via the sensor network platform;

calculating, by each of the management sub-platforms, a month-on-month reduction rate for a gas usage amount of each gas meter within a preset time interval according to gas data of each gas meter, and sending the calculated month-on-month reduction rate for the gas usage amount of each gas meter to the service platform;

sorting, by the service platform, the month-on-month reduction rate respectively sent by the plurality of management sub-platforms for the gas usage amount of each gas meter, and calculating a gas fee of each gas meter according to the sorted month-on-month reduction rate for the gas usage amount of each gas meter; and sending, by the service platform, the sorted month-on-month reduction rate for the gas usage amount of each gas meter and the gas fee of each gas meter to the user platform.

Further, the step of calculating a gas fee of each gas meter according to the sorted month-on-month reduction rate for the gas usage amount of each gas meter includes:

calculating the gas fee of each gas meter according to a preset pricing rule; and reducing, according to a reduction rule, gas fees of gas meters of which the ranks of month-on-month reduction rates are located in a preset ranking interval.

Further, the reducing, according to a preset reduction rule, of gas fees of gas meters of which the ranks of month-on-month reduction rates are located in a preset ranking interval includes:

reducing by 10% respectively for gas fees of gas meters of which the month-on-month reduction rates rank top 10%.

Further, each of the management sub-platforms calculates the month-on-month reduction rate for the gas usage amount of each gas meter in terms of a following formula:

$$\theta = \frac{y-x}{y}$$

where, the $\theta$ is a month-on-month reduction rate, the x is gas data of a gas meter in the current month, and the y is average gas data of the gas meter in previous several months of the current month.

Further, the method includes: displaying, by the user platform, sorted month-on-month reduction rates for gas usage amounts of gas meters and corresponding gas fees.

According to a second aspect, the present invention provides an IoT system; the IoT system includes a user platform, a service platform, a plurality of management sub-platforms, a sensor network platform and a plurality of object sub-platforms; the plurality of object sub-platforms are communicatively connected with the plurality of management sub-platforms via the sensor network platform; the plurality of management sub-platforms are communicatively connected with the service platform; the service platform is communicatively connected with the user platform; and each of the object sub-platforms includes a gas meter;

each of the object sub-platforms is configured to send gas data of a corresponding gas meter to a corresponding management sub-platform via the sensor network platform;

each of the management sub-platforms is configured to calculate a month-on-month reduction rate for a gas usage amount of each gas meter within a preset time interval according to gas data of each gas meter, and send the calculated month-on-month reduction rate for the gas usage amount of each gas meter to the service platform; and the service platform is configured to sort the month-on-month reduction rate respectively sent by the plurality of management sub-platforms for the gas usage amount of each gas meter, calculate a gas fee of each gas meter according to the sorted month-on-month reduction rate for the gas usage amount of each gas meter, and send the sorted month-on-month reduction rate for the gas usage amount of each gas meter and the gas fee of each gas meter to the user platform.

Further, the service platform is configured to calculate the gas fee of each gas meter according to a preset pricing rule; and reduce, according to a preset reduction rule, gas fees of gas meters of which the ranks of month-on-month reduction rates are located in a preset ranking interval.

Further, the service platform is configured to reduce by 10% respectively for gas fees of gas meters of which the month-on-month reduction rates rank top 10%.

Further, each of the management sub-platforms calculates the month-on-month reduction rate for the gas usage amount of each gas meter in terms of a following formula:

$$\theta = \frac{y-x}{y}$$

where, the θ is a month-on-month reduction rate, the x is gas data of a gas meter in the current month, and the y is average gas data of the gas meter in previous several months of the current month.

Further, the user platform is configured to display sorted month-on-month reduction rates for gas usage amounts of gas meters and corresponding gas fees.

The present invention provides a gas pricing method based on a compound IoT and an IoT system. The method is applied to the IoT system. The IoT system includes a user platform, a service platform, a plurality of management sub-platforms, a sensor network platform and a plurality of object sub-platforms; and each of the object sub-platforms includes a gas meter. The method includes: sending, by each of the object sub-platforms, gas data of a corresponding gas meter to a corresponding management sub-platform via the sensor network platform; calculating, by each of the management sub-platforms, a month-on-month reduction rate for a gas usage amount of each gas meter within a preset time interval according to gas data of each gas meter, and sending the calculated month-on-month reduction rate for the gas usage amount of each gas meter to the service platform; sorting, by the service platform, the month-on-month reduction rate respectively sent by the plurality of management sub-platforms for the gas usage amount of each gas meter, and calculating a gas fee of each gas meter according to the sorted month-on-month reduction rate for the gas usage amount of each gas meter; and sending, by the service platform, the sorted month-on-month reduction rate for the gas usage amount of each gas meter and the gas fee of each gas meter to the user platform. According to the present invention, by making a statistics of data of all gas meters in a special region, such as a residence community or an area, calculating the month-on-month reduction rate for the gas usage amount of each gas meter, and calculating the gas fee according to a rank of the month-on-month reduction rate, an encouragement is given to a user who saves gas, and the user senses the benefit of gas saving directly from the fee, thereby helping push a gas-saving social morality.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

To make the objectives, technical solutions and advantages of the embodiments of the present invention clearer, a clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by a person of ordinary skill in the art based on the embodiments of the present invention without any inventive efforts, fall into the protection scope of the present invention.

FIG. 3 and FIG. 4 respectively illustrate a schematic diagram of an application scenario of a gas pricing method based on a compound IoT provided by an embodiment of the present invention.

Figure 1:
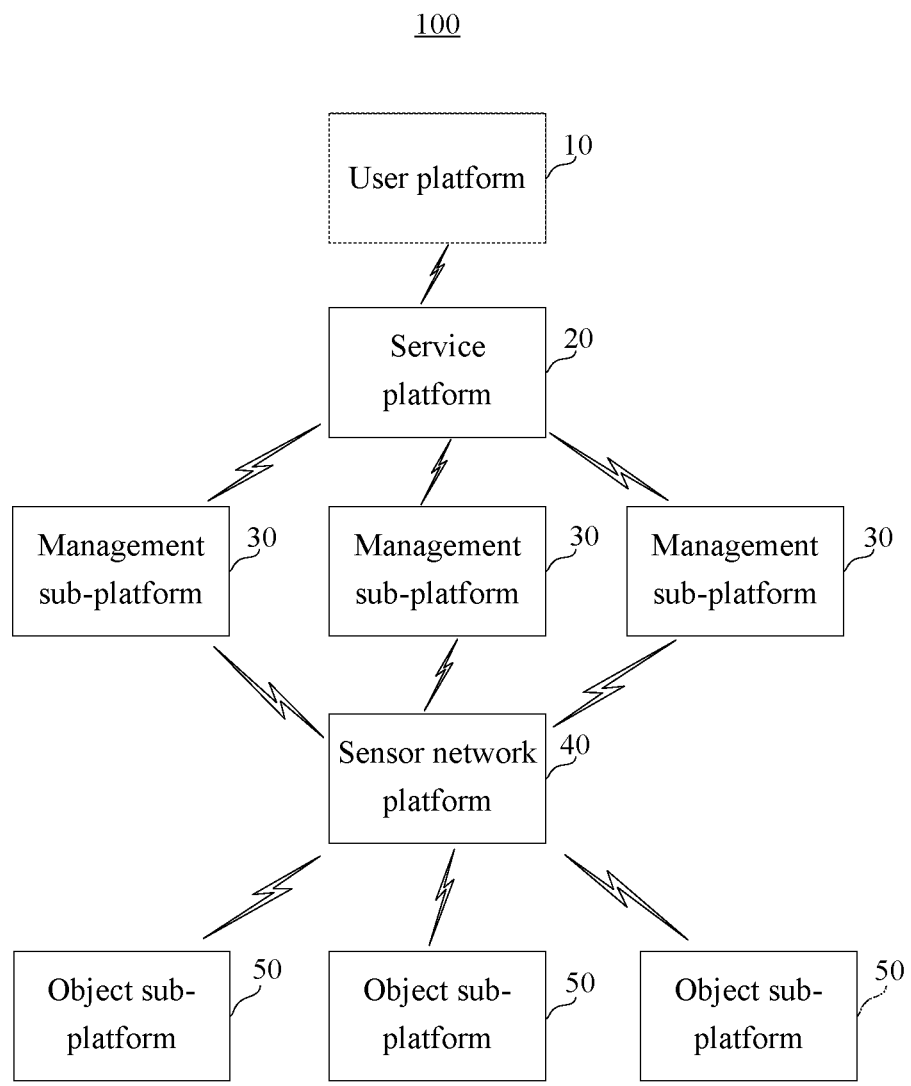
FIG. 1 illustrates a compositional schematic diagram of an IoT system provided by an embodiment of the present invention.

Numerals in the drawings: 100—IoT system; 10—user platform; 20—service platform; 30—management service platform; 40—sensor network platform; 50—object sub-platform.

DESCRIPTION OF EMBODIMENTS

A clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by those skilled in the art based on the embodiments of the present invention without any inventive efforts, fall into the protection scope of the present invention.

Referring to FIG. 1, a gas pricing method based on a compound IoT provided by an embodiment of the present invention is applied to an IoT system 100. The IoT system 100 includes a user platform 10, a service platform 20, a plurality of management sub-platforms 30, a sensor network platform 40 and a plurality of object sub-platforms 50. Herein, the plurality of object sub-platforms 50 may be communicatively connected with the plurality of management sub-platforms 30 via the sensor network platform 40 so as to send data of the object sub-platforms 50 to the management sub-platforms 30. Each of the object sub-platforms 50 communicates with a corresponding management sub-platform 30, e.g., all object sub-platforms 50 in one residence community communicate with one management sub-platform 30, and all object sub-platforms 50 in another residence community communicate with another management sub-platform 30. Each of the management sub-platforms 30 is communicatively connected with the service platform 20. The service platform 20 is communicatively connected with the user platform 10, and is configured to push gas notifications to the user platform 10. The management sub-platforms 30 and the service platform 20 each may be servers. Each of the management sub-platforms 30 may be a management server of a gas company; and the service platform 20 may be a fee server of the gas company.

Figure 2:
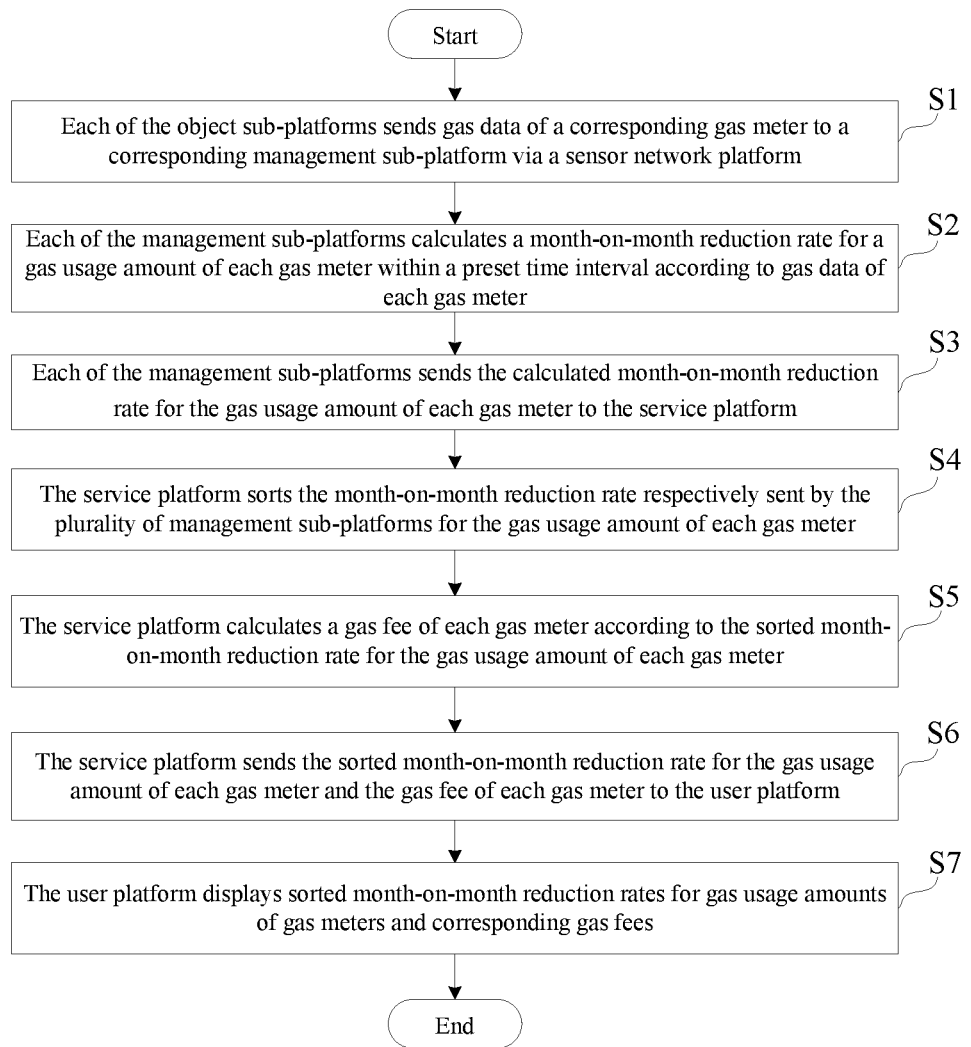
FIG. 2 illustrates a flowchart of a gas pricing method based on a compound IoT provided by an embodiment of the present invention.

Referring to FIG. 2, the gas pricing method based on the compound IoT includes the following steps:

Step S1, each of the object sub-platforms sends gas data of a corresponding gas meter to a corresponding management sub-platform via a sensor network platform.

The sensor network platform 40 may be a gateway, and a plurality of object sub-platforms 50 send gas data to the corresponding management sub-platform 30 via one gateway. A frequency that the object sub-platforms 50 send the gas data to the management sub-platform 30 may be set as required, e.g., the gas data may be sent once every other month, or once every quarter, which is not limited by this embodiment of the present invention thereto.

Step S2, each of the management sub-platforms calculates a month-on-month reduction rate for a gas usage amount of each gas meter within a preset time interval according to gas data of each gas meter.

The gas data of each gas meter represents a gas usage amount used by each user in a predetermined time. For example, if an object sub-platform 50 sends gas data to a management sub-platform 30 once every other month, the gas data represents a gas amount used by a user within one month. After a gas amount used in this month and gas data of other months in a preset time interval are calculated, a month-on-month reduction rate for the gas usage amount is obtained, e.g., a month-on-month reduction rate for the gas usage amount in this month is calculated by comparing the gas usage amount in this month with that in last month. Certainly, it is possible that data in continuous two months is not representative and cannot reflect a gas using habit of the user, e.g., the user has an emergency situation in the last month, too much or little gas was used, and thus a month-on-month reduction rate for a gas usage amount in current month is small or large and is not representative. In this embodiment, the preset time interval is set to at least six months, and month-on-month reduction rates for continuous six months are calculated to guarantee the fairness. Specifically, a calculation formula is as follows:

$$\theta = \frac{y-x}{y} \times 100\%$$

where, the $\theta$ is a month-on-month reduction rate, the x is gas data of a gas meter in the current month, and the y is average gas data of the gas meter in previous several months of the current month. For example, if the gas usage amount of a user in the current month is 40 m³, and gas usage amounts in previous five months respectively were 40 m³, 50 m³, 45 m³, 55 m³ and 35 m³, an average value for the gas usage amounts in the previous five months is (40+50+45+55+35)÷5=45 m³, and the value is bought to the above formula.

$$\theta = \frac{45-40}{45} \times 100\% = 11.11\%$$

The calculated month-on-month reduction rate for the gas usage amount of the user in the current month is 11.11%.

The month-on-month reduction rate for the gas usage amount of each gas meter is calculated in terms of the above manner.

Step S3, each of the management sub-platforms sends the calculated month-on-month reduction rate for the gas usage amount of each gas meter to the service platform.

Each of the management sub-platforms 30 calculates month-on-month reduction rates for gas usage amounts of respective managed gas meters and then sends the calculated month-on-month reduction rates to the service platform 20 for summarization.

Step S4, the service platform sorts the month-on-month reduction rate respectively sent by the plurality of management sub-platforms for the gas usage amount of each gas meter.

The service platform 20 sorts month-on-month reduction rates for gas usage amounts of a plurality of gas meters, and may, for example, sort the month-on-month reduction rates in descending or ascending sequence. Preferably, in this embodiment, the month-on-month reduction rates are sorted in descending sequence.

Step S5, the service platform calculates a gas fee of each gas meter according to the sorted month-on-month reduction rate for the gas usage amount of each gas meter.

For encouragement of gas saving, in this embodiment, the gas fee of each gas meter is calculated according to the sorted month-on-month reduction rate for the gas usage amount of each gas meter and gas data of each gas meter. For example, for a gas meter of which the month-on-month reduction rate reaches a preset standard, a certain fee is reduced. In this embodiment, first of all, the gas fee of each gas meter needs to be calculated according to a preset pricing rule, where the preset pricing rule is an existing tiered pricing rule, and the gas fee of each gas meter is calculated according to the tiered pricing rule and the gas usage amount of each gas meter. Then, gas fees of gas meters of which the ranks of month-on-month reduction rates are located in a preset ranking interval are reduced according to a preset reduction rule. Preferably, gas fees of gas meters ranking top are reduced in general. For example, gas fees of gas meters of which the month-on-month reduction rates rank top 10% are reduced by 10% respectively.

Step S6, the service platform sends the sorted month-on-month reduction rate for the gas usage amount of each gas meter and the gas fee of each gas meter to the user platform.

In this embodiment of the present invention, the user platform 10 may be a gas recharge terminal in a residence community or an area, such as a recharge terminal for property management in a residence community, or a recharge terminal for supermarkets in an area.

Step S7, the user platform displays sorted month-on-month reduction rates for gas usage amounts of gas meters and corresponding gas fees.

Referring to FIG. 3 and FIG. 4, the user platform 10 displays the sorted month-on-month reduction rates for the gas usage amounts of the gas meters and the corresponding gas fees, which may be displayed to a user for fee payment and make the user feel more intuitive.

In conclusion, the embodiment of the present invention provides a gas pricing method based on a compound IoT and an IoT system. The gas pricing method based on the compound IoT is applied to the IoT system. The IoT system includes a user platform, a service platform, a plurality of management sub-platforms, a sensor network platform and a plurality of object sub-platforms; and each of the object sub-platforms includes a gas meter. The method includes: sending, by each of the object sub-platforms, gas data of a corresponding gas meter to a corresponding management sub-platform via the sensor network platform; calculating, by each of the management sub-platforms, a month-on-month reduction rate for a gas usage amount of each gas meter within a preset time interval according to gas data of each gas meter, and sending the calculated month-on-month reduction rate for the gas usage amount of each gas meter to the service platform; sorting, by the service platform, the month-on-month reduction rate respectively sent by the plurality of management sub-platforms for the gas usage amount of each gas meter, and calculating a gas fee of each gas meter according to the sorted month-on-month reduction rate for the gas usage amount of each gas meter; and sending, by the service platform, the sorted month-on-month reduction rate for the gas usage amount of each gas meter and the gas fee of each gas meter to the user platform. According to the present invention, by making a statistics of data of all gas meters in a special region, such as a residence community or an area, calculating the month-on-month reduction rate for the gas usage amount of each gas meter, and calculating the gas fee according to a rank of the month-on-month reduction rate, an encouragement is given to a user who saves gas, and the user senses the benefit of gas saving directly from the fee, thereby helping push a gas-saving social morality.

In several embodiments provided by the present application, it should be understood that the disclosed apparatus and method may also be implemented in other manners. The described apparatus embodiments are merely exemplary. For example, the flowcharts and block diagrams in the drawings illustrate the system architecture, function, and operation of possible implementations of apparatuses, methods, and computer program products according to various embodiments of the present invention. In this regard, each block in the flowcharts or block diagrams may represent a module, program segment, or portion of code, which includes one or more executable instructions for implementing the specified logical function(s). It should also be noted that in some alternative implementation manners, the functions noted in the block may occur out of the sequence noted in the drawings. For example, two continuous blocks, in fact, may be executed concurrently, or in a reverse order, which will depend upon the functions involved. It will also be noted that each block of the block diagrams and/or flowcharts, and combinations of blocks in the block diagrams and/or flowcharts, may be implemented by a special hardware-based IoT system that performs the specified functions or acts, or by using combinations of special hardware and computer instructions.

In addition, each module in the embodiments of the present invention may exist independently, and two or more modules may be integrated into an independent part.

When a function is implemented in the form of the software functional unit and sold or used as a separate product, the function may be stored in a computer readable storage medium. Based on such understanding, the technical solutions of the present invention or the part that makes contributions to the prior art or a part of the technical solutions may be substantially embodied in a form of a software product. The computer software product is stored in a storage medium, and includes several instructions to instruct a computer device (which may be a personal computer, server, network device, or the like) to execute all or some steps of the methods described in the embodiments of the present invention. The foregoing storage medium includes: various media capable of storing a program code, such as a disk, a mobile hard disk, a Read-Only Memory (ROM), a Random Access Memory (RAM), a magnetic disk or an optical disk. It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

The above are merely preferred embodiments of the present invention, and are not intended to limit the present invention. A person skilled in the art may make various modifications and changes to the present invention. Any modification, equivalent replacement, improvement and the like made within the spirit and principle of the present invention all shall be included in a scope of protection of the present invention. It should be noted that similar reference numerals and letters refer to similar items in the following drawings, and thus once an item is defined in one drawing, it does not need to be further defined and explained in the subsequent drawings.

The foregoing descriptions are merely specific implementation manners of the present invention, but are not intended to limit a scope of protection of the present invention. Any variation or replacement readily figured out by a person skilled in the art within the technical scope disclosed in the present invention shall fall within the scope of protection of the present invention. Therefore, the scope of protection of the present invention shall be subject to the scope of protection of the claims.

It should also be noted that, in the description, such relation terms as first and second are merely used for distinguishing one entity or operation from the other entity or operation, rather than requiring or hinting that these entities or operations have any practical relation or sequence. Moreover, the terms "comprise", "include" or any other variant are intended to cover non-exclusive inclusion, so that the processes, methods, articles or devices including a series of factors not only include those factors, but also include other factors listed implicitly, or further include inherent factors of the processes, methods, articles or devices. In the absence of more limitations, the factors defined by the statement "include one . . . " do not exclude other identical factors in the processes, methods, articles or devices including said factors.

What is claimed is:

1. A gas pricing method based on a compound Internet of Things (IoT), wherein the method is applied to an IoT system; the IoT system comprises a user platform, a service platform, a plurality of management sub-platforms, a sensor network platform and a plurality of object sub-platforms; each of the object sub-platforms comprises a gas meter, wherein each of the user platform, the service platform, the sensor network platform, and the plurality of management sub-platforms includes one or more computer devices, wherein the one or more computer devices are communicatively connected to each other and to the gas meter, and wherein the plurality of object sub-platforms are communicatively connected with the plurality of management sub-platforms via the sensor network platform; and the method comprises:

generating and sending at a preset frequency, by each of the object sub-platforms, gas data of a corresponding gas meter to a corresponding management sub-platform via the sensor network platform;

calculating, by each of the management sub-platforms, a month-on-month reduction rate for a gas usage amount of each gas meter within a preset time interval according to gas data of each gas meter, and sending the calculated month-on-month reduction rate for the gas usage amount of each gas meter to the service platform;

sorting, by the service platform, the month-on-month reduction rate respectively sent by the plurality of management sub-platforms for the gas usage amount of each gas meter, and calculating a gas fee of each gas meter according to the sorted month-on-month reduction rate for the gas usage amount of each gas meter; and sending, by the service platform, the sorted month-on-month reduction rate for the gas usage amount of each gas meter and the gas fee of each gas meter to the user platform, wherein the step of calculating a gas fee of each gas meter according to the sorted month-on-month reduction rate for the gas usage amount of each gas meter further comprises:

calculating the gas fee of each gas meter according to a preset pricing rule; and reducing, according to a preset reduction rule, gas fees of gas meters of which the ranks of month-on-month reduction rates are located in a preset ranking interval, wherein the reducing, according to a preset reduction rule, of gas fees of gas meters of which the ranks of month-on-month reduction rates are located in a preset ranking interval comprises:

reducing by 10% respectively for gas fees of gas meters of which the month-on-month reduction rates rank top 10%, and wherein each of the management sub-platforms calculates the month-on-month reduction rate for the gas usage amount of each gas meter in terms of a following formula:

$$\theta = \frac{y-x}{y}$$

where, the $\theta$ is a month-on-month reduction rate, the x is gas data of a gas meter in the current month, and the y is average gas data of the gas meter in previous several months of the current month.

2. The gas pricing method based on the compound IoT according to claim 1, wherein the method further comprises:
displaying, by the user platform, sorted month-on-month reduction rates for gas usage amounts of gas meters and corresponding gas fees.

3. An Internet of Things (IoT) system, wherein the IoT system comprises a user platform, a service platform, a plurality of management sub-platforms, a sensor network platform and a plurality of object sub-platforms; the plurality of object sub-platforms are communicatively connected with the plurality of management sub-platforms via the sensor network platform; the plurality of management sub-platforms are communicatively connected with the service platform; the service platform is communicatively connected with the user platform; and each of the object sub-platforms comprises a gas meter, wherein each of the user platform, the service platform, and the sensor network platform, and the plurality of management sub-platforms includes one or more computer devices, wherein the one or more computer devices are communicatively connected to each other and to the gas meter, and wherein the plurality of object sub-platforms are communicatively connected with the plurality of management sub-platforms via the sensor network platform;

each of the object sub-platforms is configured to generate and send gas data of a corresponding gas meter to a corresponding management sub-platform via the sensor network platform at a preset frequency;

each of the management sub-platforms is configured to calculate a month-on-month reduction rate for a gas usage amount of each gas meter within a preset time interval according to gas data of each gas meter, and send the calculated month-on-month reduction rate for the gas usage amount of each gas meter to the service platform; and the service platform is configured to sort the month-on-month reduction rate respectively sent by the plurality of management sub-platforms for the gas usage amount of each gas meter, calculate a gas fee of each gas meter according to the sorted month-on-month reduction rate for the gas usage amount of each gas meter, and send the sorted month-on-month reduction rate for the gas usage amount of each gas meter and the gas fee of each gas meter to the user platform, wherein each of the management sub-platforms is configured to calculate the gas fee of each gas meter according to a preset pricing rule; and reduce, according to a preset reduction rule, gas fees of gas meters of which the ranks of month-on-month reduction rates are located in a preset ranking interval, wherein each of the management sub-platforms is configured to reduce by 10% respectively for gas fees of gas meters of which the month-on-month reduction rates rank top 10%, and wherein each of the management sub-platforms calculates the month-on-month reduction rate for the gas usage amount of each gas meter in terms of a following formula:

$$\theta = \frac{y-x}{y}$$

where, the $\theta$ is a month-on-month reduction rate, the x is gas data of a gas meter in the current month, and the y is average gas data of the gas meter in previous several months of the current month.

4. The IoT system according to claim 3, wherein the user platform is configured to display sorted month-on-month reduction rates for gas usage amounts of gas meters and corresponding gas fees.

* * * * *